United States Patent
Tanaka et al.

(10) Patent No.: US 10,248,128 B2
(45) Date of Patent: Apr. 2, 2019

(54) HAULAGE VEHICLE AND TRAVEL CONTROL SYSTEM FOR THE SAME

(71) Applicant: HITACHI CONSTRUCTION MACHINERY CO., LTD., Tokyo (JP)

(72) Inventors: Wataru Tanaka, Tokyo (JP); Shinjiro Saito, Tsuchiura (JP); Mikio Bando, Tokyo (JP); Masanori Ichinose, Tokyo (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 213 days.

(21) Appl. No.: 15/124,134

(22) PCT Filed: Mar. 3, 2015

(86) PCT No.: PCT/JP2015/056263
§ 371 (c)(1),
(2) Date: Sep. 7, 2016

(87) PCT Pub. No.: WO2016/035356
PCT Pub. Date: Mar. 10, 2016

(65) Prior Publication Data
US 2017/0017235 A1 Jan. 19, 2017

(30) Foreign Application Priority Data

Sep. 4, 2014 (JP) .................................. 2014-180464

(51) Int. Cl.
*G05D 1/02* (2006.01)
*G05D 1/00* (2006.01)

(52) U.S. Cl.
CPC ......... *G05D 1/0223* (2013.01); *G05D 1/0027* (2013.01); *G05D 1/0291* (2013.01);
(Continued)

(58) Field of Classification Search
CPC .. G05D 1/0223; G05D 1/0027; G05D 1/0291; G05D 1/0297; G05D 1/0274; G05D 1/0278; G05D 2201/021
See application file for complete search history.

(56) References Cited

U.S. PATENT DOCUMENTS 6,484,078 B1* 11/2002 Kageyama ........... G05D 1/0297
340/989
2001/0044697 A1* 11/2001 Kageyama ............ B60W 40/04
701/301
(Continued)

FOREIGN PATENT DOCUMENTS

| JP | 2000-330630 A | 11/2000 |
| JP | 2009-169581 A | 7/2009 |
| WO | 97/31302 A1 | 8/1997 |

OTHER PUBLICATIONS

International Search Report of PCT/JP2015/056263 dated Jun. 2, 2015.

*Primary Examiner* — Tuan C To
(74) *Attorney, Agent, or Firm* — Mattingly & Malur, PC

(57) ABSTRACT

A haulage vehicle comprises: a position calculating system (220) calculating an estimated position of its own vehicle; a position range calculating unit (201b) calculating a position range which is centered around the estimated position and in which the haulage vehicle is present with a predetermined expected probability; a maximum deviation amount calculating unit (602) calculating a maximum deviation amount indicating a highest value among the amounts of deviations between a target route of the haulage vehicle and each of points included in the position range; a target vehicle-speed decision unit (603) setting a target vehicle speed of the haulage vehicle to be relatively low when the maximum deviation amount is relatively large; and a target route-tracing unit (201g) performing control for the haulage (Continued)

vehicle to travel along the target route in compliance with the target vehicle speed.

6 Claims, 11 Drawing Sheets

(52) U.S. Cl.
CPC ......... *G05D 1/0297* (2013.01); *G05D 1/0274* (2013.01); *G05D 1/0278* (2013.01); *G05D 2201/021* (2013.01)

(56) References Cited

U.S. PATENT DOCUMENTS

| | | | |
|---|---|---|---|
| 2003/0154044 A1* | 8/2003 | Lundstedt | G01N 21/274 702/104 |
| 2009/0299562 A1* | 12/2009 | Sudou | G05D 1/0278 701/25 |
| 2011/0106429 A1* | 5/2011 | Poppen | G01C 21/3476 701/533 |
| 2012/0123678 A1* | 5/2012 | Poppen | G01C 21/3476 701/468 |
| 2014/0229055 A1* | 8/2014 | Itoi | H04Q 9/00 701/31.5 |
| 2015/0015421 A1* | 1/2015 | Krijger | G08G 1/0129 340/932 |
| 2015/0239470 A1* | 8/2015 | Rindfleisch | B60W 10/06 701/110 |
| 2015/0267380 A1* | 9/2015 | Kaneko | B60K 6/46 701/22 |
| 2016/0014564 A1* | 1/2016 | Del Vecchio | G08G 1/20 455/456.2 |

\* cited by examiner

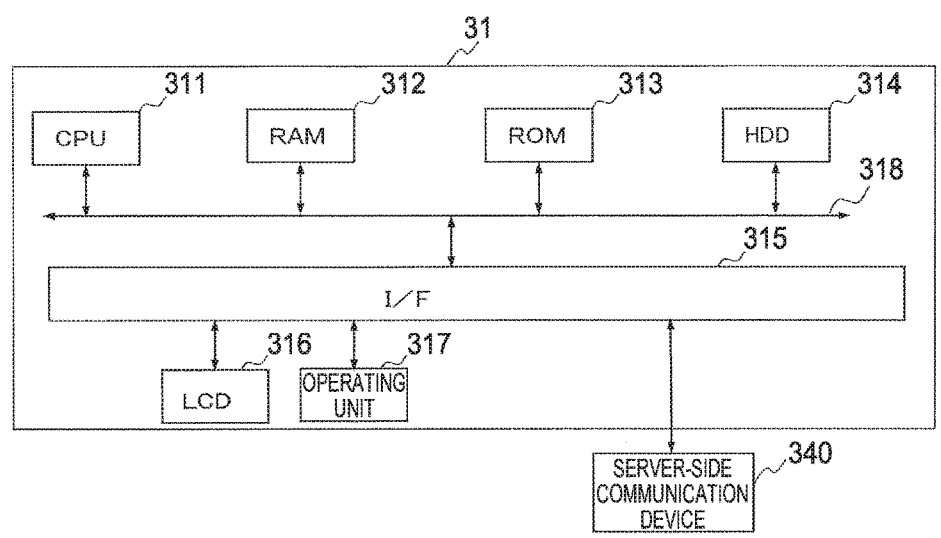
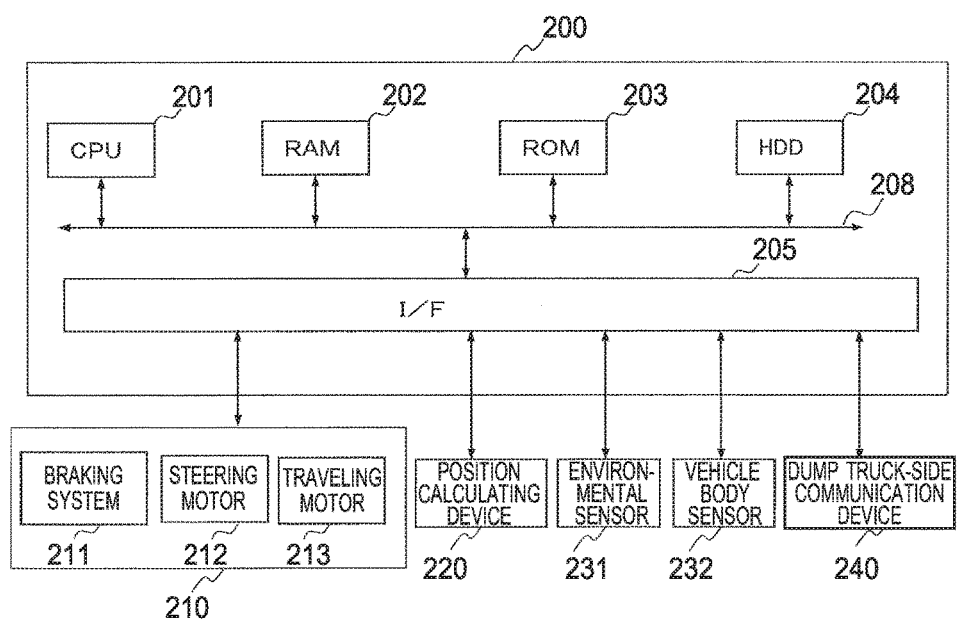

| LINK ID | FORWARD NODE ID | BACKWARD NODE ID | ROUTE REQUEST SPEED | ROAD WIDTH | SLOPE GRADIENT | CURVATURE |
|---------|-----------------|------------------|---------------------|------------|----------------|-----------|
| 21A | $(x_{22A}, y_{22A})$ | $(x_{22B}, y_{22B})$ | $V_{21A}$ | $W_{21A}$ | $S_{21A}$ | $C_{21A}$ |
| 21B | $(x_{22B}, y_{22B})$ | $(x_{22C}, y_{22C})$ | $V_{21B}$ | $W_{21B}$ | $S_{21B}$ | $C_{21B}$ |

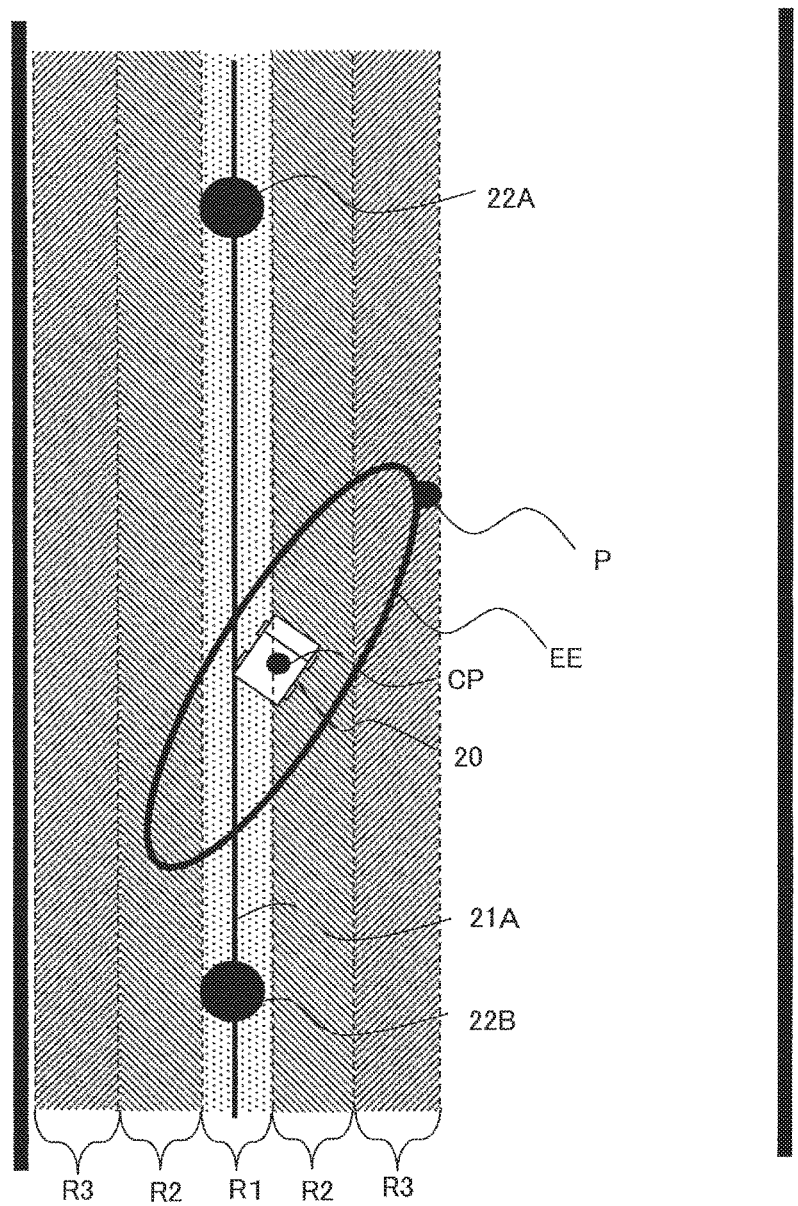

HAULAGE VEHICLE AND TRAVEL CONTROL SYSTEM FOR THE SAME

TECHNICAL FIELD

This invention relates to a haulage vehicle and a travel control apparatus for the same and, more particularly, to travel control of an autonomously-movable haulage vehicle used in a surface mine and the like.

BACKGROUND ART

A vehicle autonomously travelling without an onboard operator, so-called unmanned ground vehicle, is known as a haulage vehicle for carrying ore and/or earth and gravels excavated at a surface mine and/or the like. The unmanned ground vehicle requires the calculations of an own-vehicle position to travel autonomously. From this perspective, known processing for own-vehicle position calculating systems comprises inertial-navigation operation processing using output from a GPS (Global Positioning System) and/or an IMU (Inertial Measurement Unit).

Patent Literature 1 discloses, as travel control technologies of unmanned ground vehicles using own-vehicle positions, the configuration that sets a target vehicle speed of a unmanned ground vehicle to be smaller than a predetermined vehicle speed as the amount of positional departure between a target position on a pre-decided travel route on which the unmanned ground vehicle travels and a current position of its own vehicle becomes large.

CITATION LIST

Patent Literature

PATENT LITERATURE 1: WO/1997/031302

SUMMARY OF INVENTION

Technical Problem

Such an own-vehicle position obtained by the position calculating system contains the error from the actual own-vehicle position (true value). Therefore, if an error contained in the own-vehicle position is not taken into account to calculate the amount of positional departure from the target position of the unmanned ground vehicle, the amount of positional departure between the own-vehicle position (true value) and the target position may possibly be estimated to be lower than an actual amount of positional departure. This is not considered in Patent Literature 1, and the error contained in the own-vehicle position may possibly cause the amount of positional departure to be calculated to be extremely small, remaining a technical problem of an inadequate setting of a target vehicle speed in relation to the amount of positional departure.

The present invention has been made to address the above technical problem and an object of the present invention is to provide a haulage vehicle capable of performing travel control allowing for an error of an own-vehicle position obtained from a position calculating system, and a travel control apparatus of the haulage vehicle.

Solution to Problem

To address the above technical problems, the present invention provides a haulage vehicle connected to a control server implementing fleet management over wireless lines and autonomously traveling while taking instructions from the control server into account, the haulage vehicle including: a position calculating device calculating an estimated position of its own vehicle; a position range calculating unit calculating a position range which is centered around the estimated position and in which the haulage vehicle is present with a predetermined expected probability; a maximum deviation amount calculating unit calculating a maximum deviation amount indicating a highest value among the amounts of deviations between a target route of the haulage vehicle and each of points included in the position range; a target vehicle-speed decision unit setting a target vehicle speed of the haulage vehicle to be relatively low when the maximum deviation amount is relatively large; and a target route-tracing unit performing control for the haulage vehicle to travel along the target route in compliance with the target vehicle speed.

According to the present invention, when a highest value of the amount of positional departure between the target route and a position range having a predetermined expected probability of presence, that is, a position in which the haulage vehicle will be present (the maximum deviation amount) is relatively large, the target vehicle speed can be set to be relatively low. Because of this, if a steering angle is set, for example, in a direction toward the target route, this increases a possibility of the haulage vehicle returning to the target route in a shorter distance along the travel direction. Also, even if a steering angle is set in a different direction from the target route, the possibility of decreasing the further positional departure from the target route is increased as compared with the case of a fast vehicle speed.

Further, with the present invention, in the above configuration, when the maximum deviation amount is within a range from a minimum return vehicle-speed adoption threshold value or higher which is a distance threshold value for determining whether a predetermined minimum return vehicle speed is adopted for returning to the target route, to less than a stop determination threshold value which is a distance threshold value for determining that returning to the target route is impossible, the distance threshold value being higher than the minimum return vehicle-speed adoption threshold value, the target vehicle-speed decision unit determines that the minimum return vehicle speed is applied as the target vehicle speed.

According to the present invention, when, although the returning to the target route is possible without the need to stop, the maximum deviation amount from the target route is relatively large, constantly travelling at the minimum return vehicle speed makes it possible to increase the possibility of returning to the target route in a shorter distance along the travel direction.

Further, with the present invention, in the above configuration, the maximum deviation amount calculating unit calculates, as the maximum deviation amount, a distance of longest one of a plurality of perpendicular lines drawn to the target route from a position at which a straight line extending in parallel to the target route is tangent to outline of the position range.

According to the present invention, since length comparisons among a plurality of perpendicular lines are made to calculate the maximum deviation amount, it is possible to reduce the load on the calculation processing for the maximum deviation amount.

Further, with the present invention, in the above configuration, when the maximum deviation amount is within a range from a return vehicle-speed adoption threshold value or higher which is a distance threshold value smaller than the minimum return vehicle-speed adoption threshold value to less than the minimum return vehicle-speed adoption threshold value, the target vehicle-speed decision unit determines to apply, as the target vehicle speed, the return vehicle speed obtained by multiplying either a route request vehicle speed indicating a speed limit predetermined in map information regarding the target route or a control request vehicle speed determined by the control server on the basis of at least one of congestion conditions of the target route and a mining operation efficiency of an overall mine, whichever is a smaller vehicle-speed value, by a weight w (0<w<1) reducing as the maximum deviation amount increases.

According to the present invention, when the maximum deviation amount is equal to or larger than the return vehicle-speed adoption threshold value and less than the minimum return vehicle-speed adoption threshold value, the haulage vehicle is made to travel at a faster vehicle-speed value if the maximum deviation amount is small, but it is made to travel at a slower vehicle-speed value if the maximum deviation amount is large. This makes it possible to reduce the impact of deceleration for the returning to the target route to the extent possible.

Further, with the present invention, in the above configuration, the position calculating device is a position calculating system using Global Positioning System; and the position range calculating unit calculates an error ellipse centered around the estimated position, as the position range.

This makes it possible to determine a target vehicle speed on the basis of an error ellipse which is an expected probability distribution of presence distinctively seen from the positional estimation result obtained using GPS, enabling travel control suitable for haulage vehicles using GPS.

Furthermore, the present invention provides a haulage vehicle connected to a control server implementing fleet management over wireless lines and autonomously traveling while taking instructions from the control server into account. The haulage vehicle comprises: a travel control apparatus that controls the haulage vehicle to travel either at a route request vehicle speed indicating a speed limit predetermined in map information regarding a target route or at a control request vehicle speed determined by the control server on the basis of congestion conditions of the target route, in a first distance including the target route of the haulage vehicle, to travel at a return vehicle speed showing a vehicle-speed value reduced as the amount of positional departure from the target route increases, when the haulage vehicle is located in a second distance range adjacent to an outer side of the first distance range, and to travel constantly at a minimum return vehicle speed less than the return vehicle speed predetermined to return the haulage vehicle to the target route, when the haulage vehicle is located in a third distance range adjacent to an outer side of the second distance range; and a travel drive system that drives under control by the travel control apparatus.

According to the present invention, the range centered around the target route and having the possibility of traveling of the haulage vehicle is divided into three, the first distance range, the second distance range and the third distance range with reference to distance. When the haulage vehicle is located in the third distance range, the haulage vehicle can be constantly made to travel at the minimum return vehicle speed.

Furthermore, the present invention provides a travel control apparatus of a haulage vehicle installed in a haulage vehicle connected to a control server implementing fleet management over wireless lines and autonomously traveling on the basis of instructions from the control server and an estimated position of its own vehicle output by a position calculating system installed in the own vehicle. The travel control apparatus comprises: a position range calculating unit calculating a position range which is centered around the estimated position and in which the haulage vehicle is present with a predetermined expected probability; a maximum deviation amount calculating unit calculating a maximum deviation amount showing a highest value among the amounts of deviations between a target route of the haulage vehicle and each of points included in the position range; a target vehicle-speed decision unit setting a target vehicle speed of the haulage vehicle to be relatively low when the maximum deviation amount is relatively large; and a target route-tracing unit performing control for the haulage vehicle to travel along the target route in compliance with the target vehicle speed.

As a result, the larger the maximum value of the amount of positional departure between a target route and a position having the possibility of presence of a haulage vehicle (the maximum deviation amount), the lower the target vehicle speed can be set. Because of this, if a steering angle is set, for example, in a direction toward the target route, this increases a possibility of the haulage vehicle returning to the target route in a shorter distance along the travel direction. Even if a steering angle is set in a different direction from the target route, the possibility of decreasing the further positional departure from the target route is increased as compared with the case of a fast vehicle speed.

Advantageous Effect of Invention

According to the present invention, it is possible to provide a haulage vehicle enabling travel control allowing for an error of an own-vehicle position obtained from a position calculating system and a travel control apparatus of the haulage vehicle. The forgoing and other aspects, features and advantages of the present invention are apparent from and will be elucidated with reference to the embodiments described hereinafter.

BRIEF DESCRIPTION OF DRAWINGS

FIGS. 2(a) and 2(b) are hardware block diagrams of a control server and a dump truck 20, FIG. 2(a) showing the control server and FIG. 2(b) showing the dump truck.

FIG. 11 is a diagram illustrating a concept of another embodiment.

DESCRIPTION OF EMBODIMENTS

Embodiments in accordance with the present invention will now be described with reference to the accompanying drawings. In the following embodiments, the description may be divided into a plurality of sections or embodiments if necessary for convenience. In the following embodiments, if a reference is made to the number of elements and the like (including a count, a numeric value, an amount, a range and the like), unless otherwise specified and limited theoretically obviously to a specific number, and the like, the number is not limited to the specific number and may be either equal to or greater than or equal to or less than the specific number. It should be noted that, in the following embodiments, unless otherwise specified and considered definitely indispensable in theory, and the like, the structural elements (including processing steps and the like) are not necessarily indispensable.

Some or all of configurations, functions, processing units and the like in each of the following embodiments may also be implemented as, for example, integrated circuitry, other hardware. Each of the configurations, functions, processing units, processing units and the like which will be described later may also be implemented as a program running on a computer, that is, may be implemented as software. Information in the form of a program, table, file, and/or the like implementing each of the configurations, functions, processing units, processing units and the like may be stored in a storage unit such as a memory, a hard disc, SSD (Solid State Drive) or the like, or on a storage medium such as an IC card, a SD card, a DVD or the like.

Embodiments in accordance with the present invention will now be described in detail along with the accompanying drawings. It should be noted that, throughout the drawings used to describe the embodiments, the same or related reference signs are used to refer to members having the same functions, and a repeated description is omitted. Further, in the following embodiments, the same or like portion is not repeatedly described in principle unless otherwise required.

First Embodiment

Figure 1:
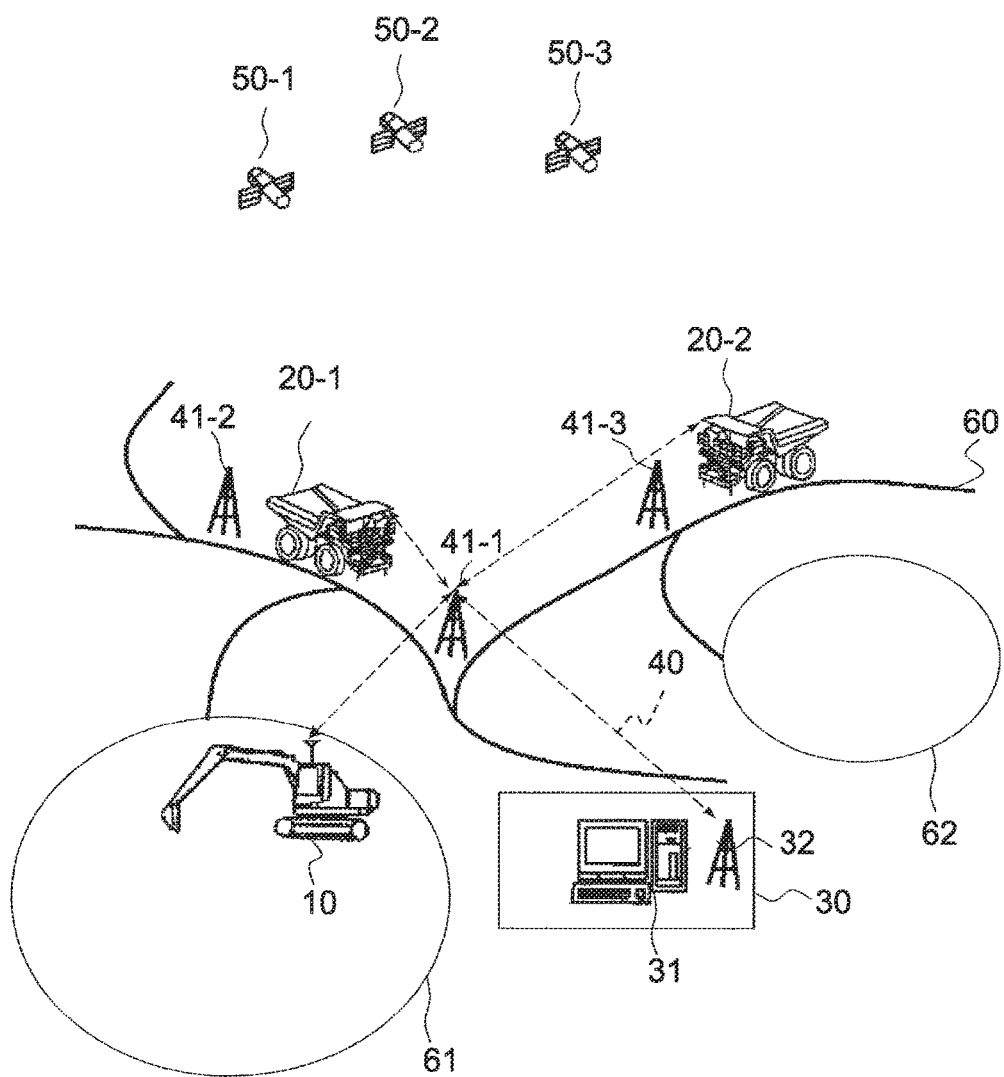
FIG. 1 is a diagram illustrating the schematic layout of a mine.

Described with reference to FIG. 1 is schematic layout of a mine in which a mining dump truck (hereinafter referred to as a "dump truck") travels as a haulage vehicle mounted with a position calculating system in accordance with the embodiment. FIG. 1 is a diagram illustrating the schematic layout of the mine.

As illustrated in FIG. 1, a travel route 60 is provided in a mine for connection between a loading site 61 (analogous to a pickup location) and a dumping site 62 (analogous to a dumping location). In the loading site 61 an excavator 10, which carries out the operation of loading earth, gravels and/or ores, carries out the excavation operation. Then, dump trucks 20-1, 20-2 are loaded with the load such as earth, gravels, ores and/or the like by the excavator 10 at the loading site 61, and then travel along the travel route 60 toward the dumping site 62. Upon arrival at the dumping site 62, the dump trucks 20-1, 20-2 dump the load. Then, the dump trucks 20-1, 20-2 travel unloaded toward the loading site 61.

The dump trucks 20-1, 20-2 are connected in communication with a control server 31 installed in a control center 30 over wireless communication lines 40. Thus, the dump trucks 20-1, 20-2 travel under control of the control server 31. Reference sign 32 in FIG. 1 denotes a radio antenna connected to the control server 31 and reference signs 41-1, 41-2, 41-3 denote wireless mobile stations. In the following description, when a distinction between the dump trucks 20-1 and 20-2 is not needed, the "dump truck 20" is used.

The dump truck 20 is equipped with a position calculating system (not shown in FIG. 1) which receives positioning radio waves from at least three navigation satellites 50-1, 50-2, 50-3 of GNSS (Global Navigation Satellite System) to obtain a position of the vehicle itself. For GNSS, GLONASS (Global Navigation Satellite System) and GALILEO, in addition to GPS, may be employed.

With taking into account the travel positions and target routes of all the dump trucks 20-1, 20-2, the mining operation target, the mining operation efficiency and the like, the control server 31 calculates (decides) a control request vehicle speed which is a vehicle speed (scalar quantity) intended to be applied to each of the dump trucks 20-1, 20-2 on the travel when viewed from the perspective of the control server 31. Then, the control server 31 notifies each respective dump truck 20-1, 20-2 of the corresponding calculation result. The control request vehicle speed is a vehicle speed that is obtained by making correction for a speed limit in each segment on the travel route 60 (route request vehicle speed) on the basis of fleet operation conditions including the number of dump trucks 20 during operation and an actual traffic congestion state, the speed limit being defined in view of a curvature of a curve, a slope gradient and a road width in map information on the travel route 60. Therefore, the route request vehicle speed is the maximum vehicle speed in each segment, and the control request vehicle speed has a vehicle-speed value equal to or lower than the route request vehicle speed. It should be noted that a vehicle speed used herein is a scalar quantity.

Hardware configuration of the control server 31 and the dump truck 20 in FIG. 1 will now be described with reference to FIG. 2. FIGS. 2(a) and 2(b) are hardware block diagrams of the control server 31 and the dump truck 20, FIG. 2(a) showing the control server and FIG. 2(b) showing the dump truck.

As illustrated in FIG. 2(a), the control server 31 comprises a CPU 311, a RAM (Random Access Memory) 312, a ROM (Read Only Memory) 313, a HDD (Hard Disk Drive) 314, an I/F 315, and a bus 318. The CPU. 311, RAM 312, ROM 313, HDD 314 and the I/F 315 are interconnected via the bus 318.

Further, the control server 31 is equipped with an LCD (Liquid Crystal Display) 316 and an operating unit 317 which are connected to the I/F 315.

The CPU 311 is a computing unit, controlling the operation of the overall control server 31.

The RAM 312 is a volatile storage medium from/to which information can be read/written at high speed, which is used as workspace by the CPU 311 processing information.

The ROM 313 is a read-only, nonvolatile storage medium, in which an autonomous travel control program which is a feature of the present invention is stored.

The HDD 314 is a nonvolatile storage medium from/to which information can be read/written, in which an OS (Operating System), a variety of control programs, application programs and/or the like are stored.

The LCD 316 is a visual user interface for the user to check the travel conditions of dump trucks 20 within the mine.

The operating unit 317 is a user interface, such as a key board, a touch panel (not shown) overlaid on the LCD 316 and/or the like, for the user to enter information into the control server 31.

The I/F 315 of the control server 31 is connected to a server-side communication device 340 for connection to the wireless communication lines 40.

On the other hand, as illustrated in FIG. 2(b), a dump truck 20 comprises: a travel control apparatus 200 performing control processing for autonomous travel; a travel drive device 210 driving the dump truck 20 to travel, based on control instructions received from the travel control apparatus 200; a position calculating device 220 for calculations of an estimated position of its own vehicle of the dump truck 20; an environmental sensor 231, such as a millimeter-wave sensor or the like, for the recognition of environment around the dump truck 20; a vehicle body sensor 232 used to recognize vehicle body information about a vehicle body tilt, a carrying load and/or the like; and a dump truck-side communication device 240 for connection to the wireless communication lines 40.

The travel drive device 210 comprises a braking system 211 applying brakes to the dump truck 20, a steering motor 212 for making a change to the steering angle of the dump truck 20, and a traveling motor 213 for traveling of the dump truck 20.

The position calculation device 220 is a GPS or an IMU which receives positioning radio waves from the navigation satellites 50-1, 50-2, 50-3 to calculate an estimated position of its own vehicle.

The travel control apparatus 200 comprises a CPU 201, a RAM 202, a ROM 203, a HDD 204, an I/F 205 and a bus 208. The CPU 201, RAM 202, ROM 203, HDD 204, and the I/F 205 are interconnected through the bus 208. Further, the travel drive device 210, position calculating device 220, environmental sensor 231, vehicle body sensor 232 and the dump truck-side communication device 240 are connected to the I/F 205.

In such a hardware configuration, the autonomous travel control program stored in the ROM 203, 313, the HDD 204, 314 or a not-shown storage medium such as an optical disc or the like is read into the RAM 202, 312, so that the operation is effected under the control of the CPU 201, 311. As a result, the autonomous travel control program (software) and the hardware cooperate to form functional blocks for implementation of the functions of the control server 31 and the travel control apparatus 200. It should be noted that although in the embodiment the configuration of the control server 31 and the travel control apparatus 200 has been described in terms of a combination of software and hardware, the dump truck 20, in particular, may be configured using a logic circuit to implement the functions of the autonomous travel control program executed on the dump truck.

Figure 3:
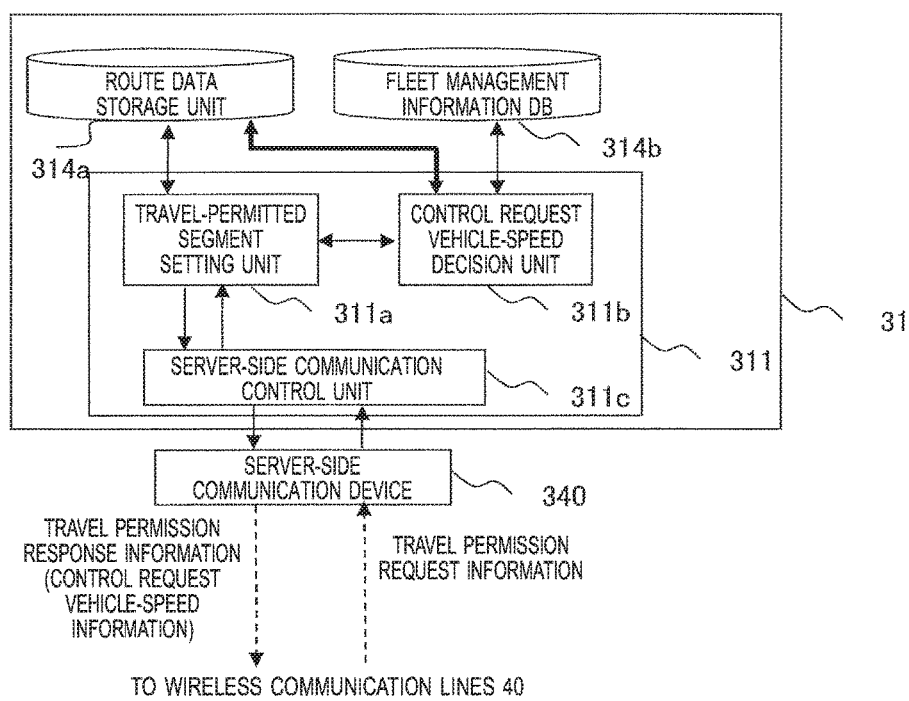
FIG. 3 is a functional block diagram illustrating principal functions of the control server.

The functional configuration of the control server 31 will now be described with reference to FIGS. 3 and 4. FIG. 3 is a functional block diagram showing the principal functions of the control server 31. FIGS. 4 (a) and 4 (b) are diagrams illustrating an example of the route data stored in the control server, in which FIG. 4 (a) represents schematically the route data, and FIG. 4 (b) illustrates an example data structure of the route data.

As illustrated in FIG. 3, the control server 31 comprises a travel-permitted segment setting unit 311a, a control request vehicle-speed decision unit 311b, a server-side communication control unit 311c, a route data storage unit 314a, and a fleet management information database (hereinafter the term "database" is abbreviated to "DB") 314b. The travel-permitted segment setting unit 311a, control request vehicle-speed decision unit 311b and the server-side communication control unit 311c consist of the autonomous travel control program executed by the control server 31.

Figures 4A, 4B:
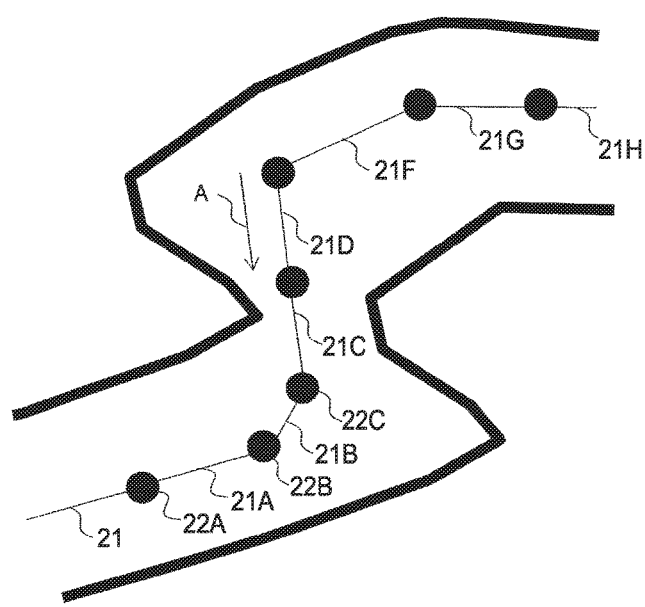
FIGS. 4(a) and 4(b) are a diagram and a table illustrating example route data stored in the control server, FIG. 4(a) showing a schematic representation of the route data and FIG. 4(b) showing an example data structure of the route data.

The route data storage unit 314a is configured using a storage device for permanent storage such as HDD 314. As illustrated in FIG. 4(a), the route data is defined by position information on each respective points (hereinafter referred to as a "node") 22 on the travel route 60 and links 21 connecting one node 22 to another. The route data may also include topographic information regarding the mine and absolute coordinates (3D real coordinates calculated based on positioning radio waves) of each node 22. Each respective node 22 is assigned identification information to identify uniquely the node 22 (hereinafter referred to as a "node ID").

Each of the links 21 has a forward direction (the direction of arrow A in FIG. 4(a)), in which a forward node 22 and a backward node 22 are defined. Further, as shown in FIG. 4(b), in the route data, the identification information for unique identification of each respective link (e.g., 21A) is associated with data on coordinate values $(x_{22A}, y_{22A})$ of the forward node ID of the link 21, coordinate values $(x_{22B}, y_{22B})$ of the backward node ID of the link 21, a route request vehicle speed $V_{21A}$ at which a vehicle travels the link 21, a road width $W_{21A}$, a slope gradient $S_{21A}$ and a curvature $C_{21A}$.

The route request vehicle speed is determined based on the road specifications such as the slope gradient, the curvature, the road width, etc. of the route, and/or the like. The route request vehicle speed is a candidate for the target vehicle speed when the dump truck 20 travels actually.

The fleet management information DB 314b stores the fleet management information indicating a position of each respective dump truck traveling the travel route 60.

The travel-permitted segment setting unit 311a responds to the travel permission request information transmitted from each dump truck 20 to establish the subsequent travel permitted segment for the corresponding dump truck 20. Specifically, the fleet management information of the fleet management information DB 314b is accessed in order to acquire positions of other dump trucks traveling ahead of the damp truck 20. Next, the route data in the route data storage unit 314a is accessed in order to establish a front boundary point of a newly set travel-permitted segment at a point that is located in the rearward direction at a distance required for the dump truck 20 to be stopped at least by applying brakes (at a stoppable distance) from a current location of another dump truck traveling ahead of the dump truck 20 on the travel route 60. Further, a rear boundary point is established at a stoppable distance from a current position of the dump truck 20. Then, the region between the front boundary point and the rear boundary point is set as a new travel-permitted segment to be assigned to the dump truck 20 making the travel permission request.

The control request vehicle-speed decision unit 311b determines a control request vehicle speed. Specifically, the control request vehicle-speed decision unit 311b reads the route data from the route data storage unit 314a, and consults the fleet operation information stored in the fleet management information DB 314b, so that the control request vehicle-speed decision unit 311b determines a control request vehicle speed in view of a route request vehicle speed assigned to a link contained in the new travel-permitted segment set for the dump truck 20, a distance from another vehicle traveling ahead of the dump truck 20, and conditions of traffic congestion. In most cases, the maximum control request vehicle speed is a vehicle speed assigned to a link in the route data, and in the event of traffic congestion a vehicle speed lower than it is determined as a control request vehicle speed. The control request vehicle speed is output to the travel-permitted segment setting unit 311a.

The travel-permitted segment setting unit 311a generates travel permission response information indicating the front boundary point and the rear boundary point of the newly set travel permitted segment and the control request vehicle speed, and outputs it to the server-side communication control unit 311c.

The server-side communication control unit 311c controls reception of travel permission request information of each dump truck 20 and transmission of the travel permission response information generated for the request.

Figure 5:
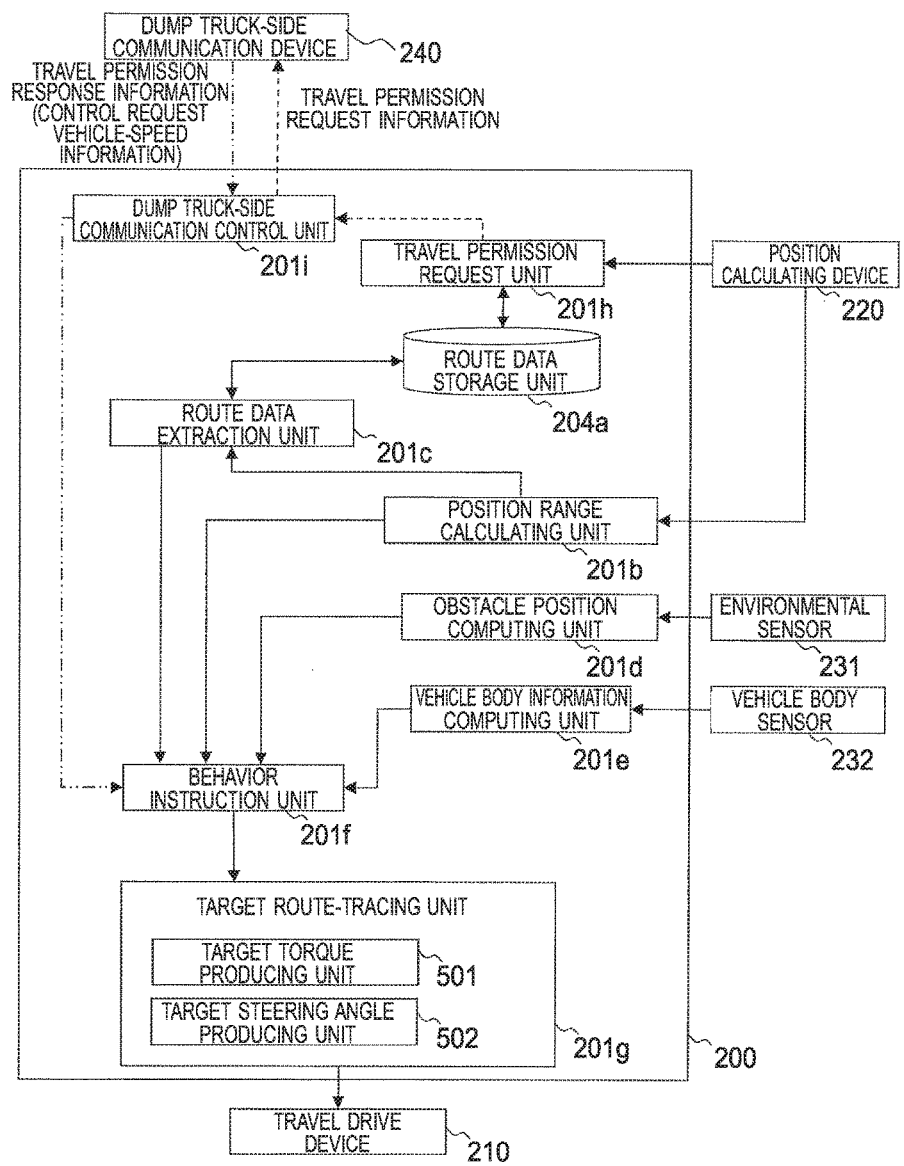
FIG. 5 is a block diagram illustrating the functional configuration of the dump truck 20.
Figure 6:
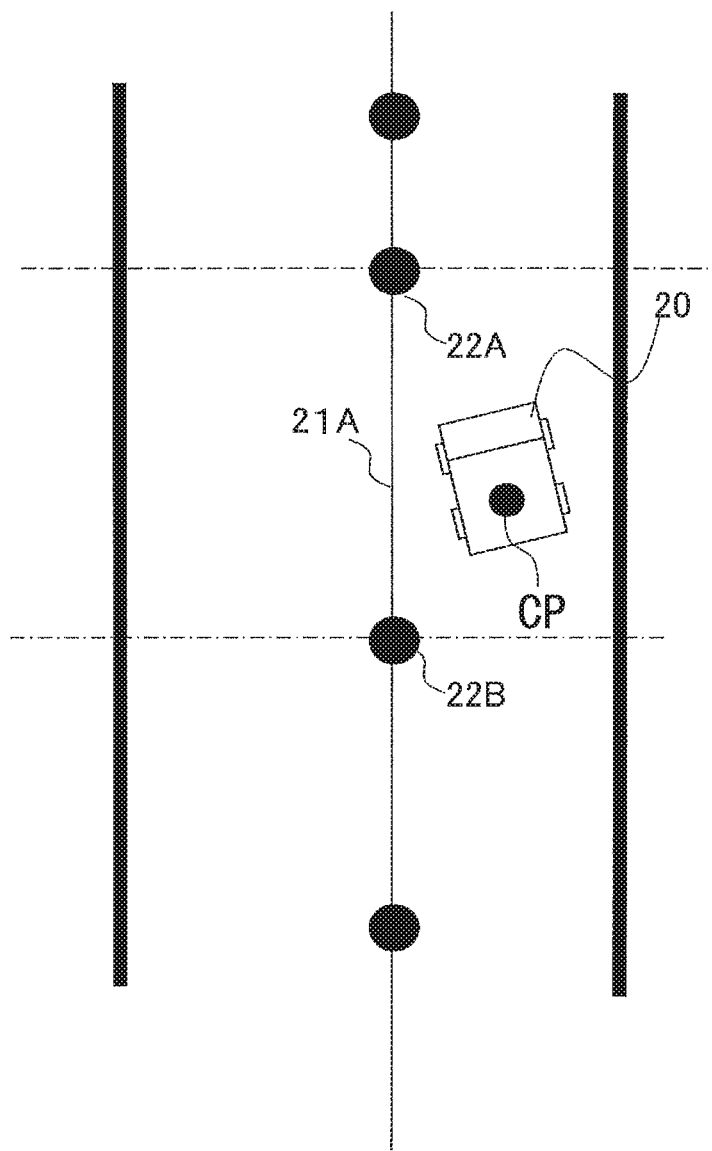
FIG. 6 is an explanatory diagram illustrating the processing for looking for a matching link.
Figure 7:
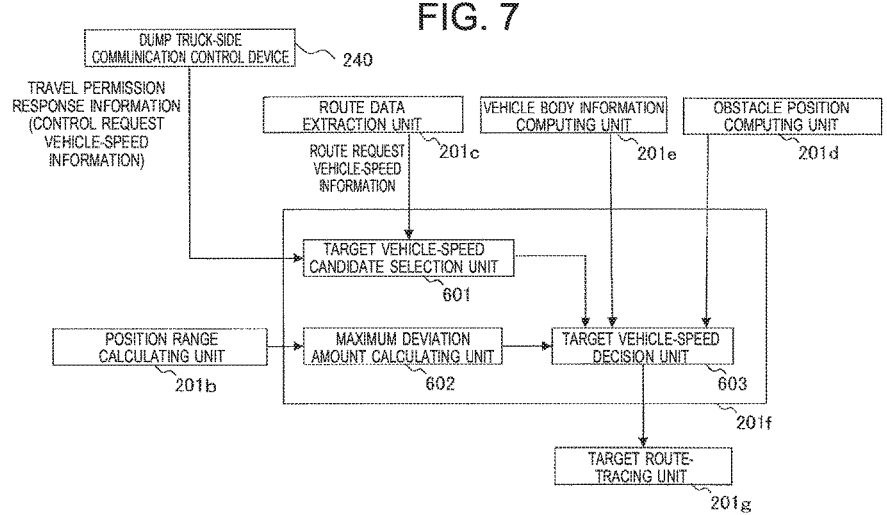
FIG. 7 is a block diagram illustrating the functional configuration of the behavior instruction unit in FIG. 5.
Figure 8:
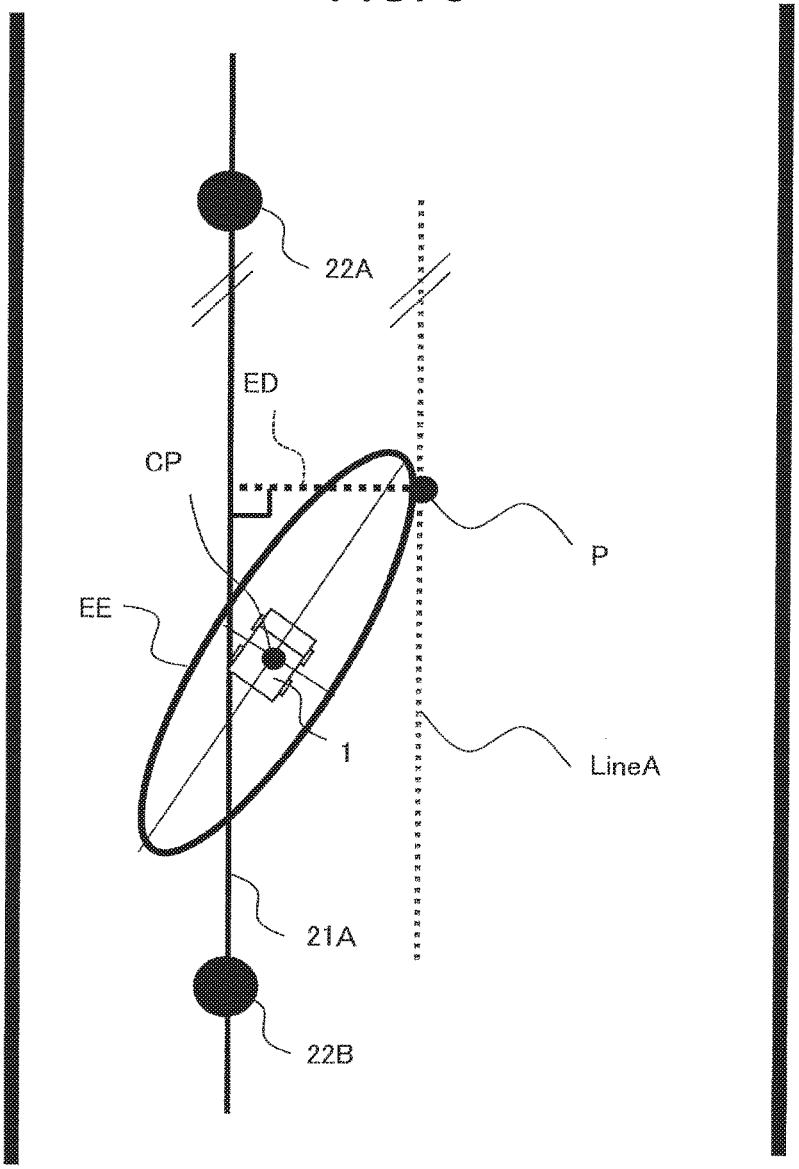
FIG. 8 is an explanatory diagram illustrating the processing for calculating the maximum deviation amount.

The functional configuration relating to autonomous travel of the dump truck 20 will now be described with reference to FIG. 5 to FIG. 8. FIG. 5 is a block diagram illustrating the functional configuration of the dump truck 20. FIG. 6 is an explanatory diagram illustrating the processing for searching a matching link. FIG. 7 is a block diagram illustrating the functional configuration of a behavior instruction unit in FIG. 5. FIG. 8 is an explanatory diagram illustrating the processing of calculating the maximum amount of deviation.

As illustrated in FIG. 5, the travel control apparatus 200 comprises: a route data storage unit 204a that has travel routes and information associated with the travel route stored therein; a position range calculating unit 201b that calculates a position range centered around an estimated position of its own vehicle calculated by the position calculating device 220, where the dump truck 20 is present with an expected probability determined in advance (for example, 95% confidence or higher); a route data extraction unit 201c that extracts pertinent data from the route data storage unit 204a; an obstacle position computing unit 201d that detects a position of an obstacle ahead; a vehicle body information computing unit 201e that recognizes vehicle body conditions such as a traveling vehicle speed, a steering angle, a carrying weight and/or the like; a behavior instruction unit 201f that outputs instruction information required to determine a target vehicle speed of its own vehicle, a target route and trace the target route; a target route-tracing unit 201g that determines control variables of driving, braking and steering which are required to move at a target vehicle speed along a target route; a travel permission request unit 201h that, when the dump truck 20 comes near the end point (front boundary point) of the current travel permitted segment in which the dump truck 20 is travelling, makes a request for the setting of a new travel permitted segment for subsequently travelling; and a dump truck-side communication control unit 201i that performs control for wireless communication with the control server 31.

The route data storage unit 204a is configured to record route data representing the route to be travelled by the dump truck 20 as a group of links each having points, called nodes, at both ends. Further, in the configuration, a link ID and its accompanying information are associated with each other, so that, upon designation of one link, the data linked to the designated link can be extracted.

The position range calculation unit 201b calculates a probability distribution representing what degree of confidence is placed in a current result of computation. In the embodiment, a GPS is used as the position calculating device 220 and an error ellipse is used as a probability distribution, which is reflected in the position information to determine a position range. In the following description, the "error ellipse" is used not only as simply a probability distribution but also as what means a position range which is centered around the estimated position and in which the probability distribution of the error ellipse is reflected.

The error ellipse represents, in the form of an ellipse, the range in a two-dimensional plane in which its own vehicle may be present at the time of a computation of an estimated position of its own vehicle (that is, a measured position error), and also represents, in the form of a two-dimensional elliptical shape, the boundary of the range in which the own-vehicle position is present with a certain probability or higher, the range resulting from the merge of a presence range with a certain probability or higher in the travel direction of the vehicle with an presence range with a certain probability or higher in the sideways direction of the vehicle. An estimated position described here means a position in which there is a highest possibility of presence of its own vehicle within the error ellipse range, showing that the closer to the perimeter area of the error ellipse, the possibility of presence of its own vehicle becomes lower. That is, a possibility on the perimeter of the error ellipse shows that its own vehicle may be present with a low expected probability but with a certain probability or higher, for example, a 95% probability or higher.

The use of an error ellipse enables a calculation of a target vehicle speed using an error ellipse which is a probability distribution with a distinctive error reflected in an estimated position obtained by using GPS, thus providing travel control suitable for GPS-equipped dump trucks.

The position range calculated by the position range calculating unit 201b is output to the behavior instruction unit 201f.

It should be noted that the probability distribution showing an expected probability of the own-vehicle position is not limited to the error ellipse, but may be produced as, for example, a two-dimensional normal distribution in which a probability at some coordinates on X, Y coordinates is plotted on the Z axis orthogonal to the X Y plane.

Based on the position range obtained from the position range calculating unit 201b, the route data extraction unit 201c extracts route data about the proximity of the position. By way of example, the state of extraction of data about the proximity of an own-vehicle position is shown in FIG. 7. The route data extraction unit 201c compares an own-vehicle position CP in the position range obtained from the position range calculating unit 201b with coordinate values of a forward node (forward node 22A) and an backward node (e.g., 22B) of each link (e.g., link 21A). Then, the route data extraction unit 201c selects nearest one from the links where the own-vehicle position CP will be located between the forward nodes 22A and the backward nodes 22B, and determines the selection as a matching link 21A. Then, the route data extraction unit 201c extracts route data linked to the determined matching link 21A from the route data stored in the route data storage unit 204a. The route data extraction unit 201c outputs the extracted route data to the behavior instruction unit 201f.

The obstacle position computing unit 201d performs, in particular, calculations of the presence/absence of an obstacle positioned ahead of the dump truck 20 in the travel direction (for example, another vehicle ahead) and a distance from the dump truck 20 on the basis of, for example, the output of the environmental sensor 231 such as a millimeter-wave sensor, a stereocamera or the like. When detecting some obstacle, the obstacle position computing unit 201d outputs the detection result to the behavior instruction unit 201f. Based on the detection result, the behavior instruction unit 201f effects the braking operation for deceleration or stopping in order to avoid a collision, for example.

The vehicle body information computing unit 201e performs the calculations to determine values indicating the vehicle body conditions of the dump truck 20 such as a steering angle, a traveling speed, a carrying load and the like on the basis of the outputs from various vehicle body sensors 232. For example, the vehicle body information computing unit 201e performs the calculations of a steering angle on the basis of the output from a rotation angle sensor mounted on a steering shaft. The vehicle body information computing unit 201e also performs the calculations of a travel vehicle speed on the basis of the rotational speed output from a wheel rotational speed sensor measuring a rotational speed of a front wheel and/or rear wheel and tire specifications. Further, the vehicle body information computing unit 201e performs the calculations of the carrying load on the basis of the output from a pressure sensor capable of measuring a pressure of a suspension placed in each wheel. The vehicle body information computing unit 201e outputs the extracted route data to the behavior instruction unit 201f. Based on the detection result, the behavior instruction unit 201f performs the travel control appropriate to the vehicle body information, for example, the brakes is applied at earlier time when no load is carried than that when a load is carried.

The target route-tracing unit 201g is configured to perform the control for the dump truck 20 to travel along a target route in consonance with the target vehicle speed determined by the behavior instruction unit 201f. The target route-tracing unit 201g comprises a target torque producing unit 501 that generates a traveling motor torque instruction for achieving the target vehicle speed, and a target steering angle producing unit 502 that generates a steering angle instruction for achieving the target route.

The target torque producing unit 501 acquires a, target vehicle speed from the behavior instruction unit 201f, and feeds a difference between the target vehicle speed and a value of a current vehicle speed back in order to produce a target travel torque to reduce the difference.

The target steering angle producing unit 502 acquires travel permission response information from the dump truck-side communication control unit 201i to acquire position information on a target route (travel permitted segment). Then, a positional departure between the target route and the estimated position obtained from the position range calculating unit 201b is fed back to produce a target steering angle to reduce the difference.

The travel permission request unit 201h collates the estimated own-vehicle position obtained from the position range calculating unit 201b with the route data read from the route data storage unit 204a, and determines whether or not its own vehicle reaches the point where travel permission request information is transmitted to make a request to establish the subsequent travel permitted segment (travel transmission request point). If the vehicle has reached, the travel permission request unit 201h transmits the travel permission request information to the dump truck-side communication control unit 201i.

The dump truck-side communication control unit 201i controls transmission of the travel permission request information for a request for the subsequent travel permitted segment to the control server 31, and reception of travel permission response information (including the control request vehicle-speed information) from the control server 31.

The behavior instruction unit 201f comprises, as illustrated in FIG. 7, a target vehicle-speed candidate selection unit 601 that selects one from a plurality of target vehicle-speed candidates, a maximum deviation amount calculating unit 602 that calculates a maximum amount of deviation having the largest value of the amounts of deviation between the target route of the dump truck 20 and the respective points included within the position range, and a target vehicle-speed decision unit 603 that determines a relatively low target vehicle speed of the haulage vehicle when the maximum amount of deviation is relatively large.

The target vehicle-speed candidate selection unit 601 acquires (reads) a route request vehicle speed from the route information in the route data linked to the matching link 21A acquired from the route data extraction unit 201c, and also reads a control request vehicle speed included in the travel permission response information output from the dump truck-side communication control unit 201i. And, the target vehicle-speed candidate selection unit 601 compares the two vehicle speeds with each other to select a lower vehicle speed as a candidate for target vehicle speeds. The target vehicle-speed candidate selection unit 601 outputs the selected target vehicle-speed candidate to the target vehicle-speed decision unit 603.

As illustrated in FIG. 8, the maximum deviation amount calculating unit 602 determines a maximum deviation amount MaxD between the own-vehicle position CP and the matching link 21A which is a target route on the basis of the own-vehicle position CP and the error ellipse EE which are obtained from the position range calculating unit 201b, the matching link 21A obtained from the route data extraction unit 201c, and coordinates of the forward node 22A and the backward node 22B linked to the matching link. The maximum deviation amount MaxD is defined as a conceivable maximum amount of departure from the matching link 21A which is a target route. The own-vehicle position CP and the error ellipse EE are output from the position range calculating unit 201b. This own-vehicle position CP is a position in which there is a highest possibility of presence in terms of probability, and a region centered around this position where there is a possibility of presence with a certain probability or higher is represented as an error ellipse EE. In other words, there is a possibility that the dump truck 20 is present as long as within the error ellipse EE. After obtaining the own-vehicle position CP and the error ellipse EE, the maximum deviation amount calculating unit 602 calculates a maximum deviation point P which is a point deviating farthest from the matching link 21A which is a target route. The maximum deviation point P can be determined as a position where Line A extending linearly in parallel to the matching link 21A is tangent to the outline of the error ellipse EE. The maximum deviation amount calculating unit 602 determines that a maximum deviation amount MaxD is a maximum value of the length (longest distance) of a maximum deviation point perpendicular line ED which is a perpendicular line drawn from the maximum deviation point P to the matching link 21A which is a target route.

The target vehicle-speed decision unit 603 determines a target vehicle speed on the basis of the target vehicle-speed candidate notified by the target vehicle-speed candidate selection unit 601 and the maximum deviation amount MaxD notified by the maximum deviation amount calculating unit 602, and then outputs it to the target route-tracing unit 201g. At this time, a correction may be made for the target vehicle speed thus determined, on the basis of the outputs from the obstacle position computing unit 201d and vehicle body information computing unit 201e. If a correction has been made, a vehicle speed slower than the determined target vehicle speed may be applied.

As a rule, in vehicles, as well as in autonomously traveling dump trucks, if the steering angle is the same, as the travel vehicle speed is lower, the amount of departure from a target route can be reduced in a shorter distance in the travel direction. Therefore, in order to reduce the amount of departure from a target route in a shorter possible distance in the travel direction, a decrease in travel vehicle speed is required. In short, the target vehicle speed may be decreased for a decrease in travel vehicle speed.

Here, the own-vehicle position of the dump truck 20 that has been calculated based on the output of the position calculating device 220 as described above is present on the perimeter of the error ellipse with a certain probability. Accordingly, for a higher degree of safety even if the possibility is low, in the embodiment, the amount of departure from a target route is calculated by employing a position having a largest amount of departure from a target route in the error ellipse (maximum deviation point) as an estimated position of its own vehicle used to determine a target vehicle speed.

Given these circumstances, the target vehicle-speed decision unit 603 makes a correction for the target vehicle-speed candidate selected by the target vehicle-speed candidate selection unit 601 on the basis of the maximum deviation amount MaxD which is a maximum amount of departure from a target route. Then, the target vehicle-speed decision unit 603 outputs the corrected target vehicle speed to the target route-tracing unit 201g. This makes it possible to reduce the amount of deviation in a shorter distance in the travel direction.

Figure 9:
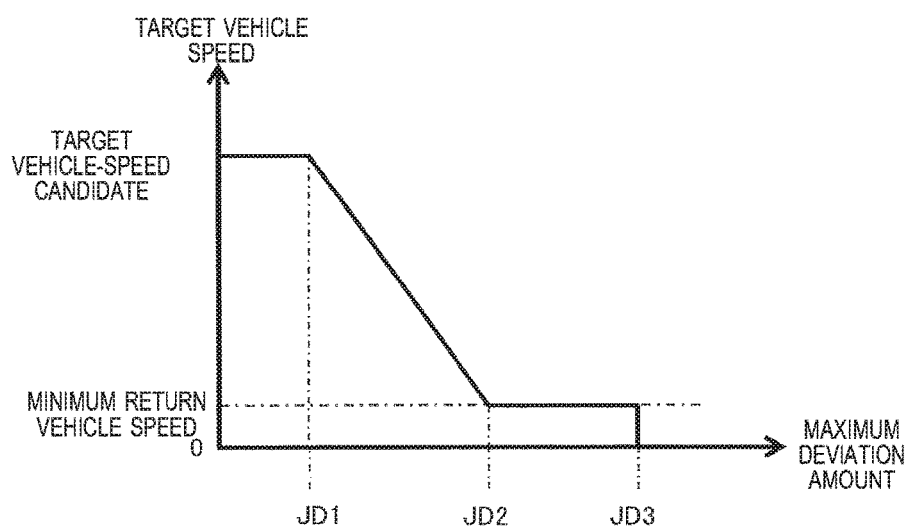
FIG. 9 is a table showing the relationship between the maximum deviation amount and the target vehicle speed.

FIG. 9 is a table showing the relationship between a maximum deviation amount and a target vehicle speed. In the table in FIG. 9, when the maximum deviation amount MaxD is less than a return vehicle-speed adoption threshold value JD1 used to make a determination whether a return vehicle speed lower than a target vehicle-speed candidate is adopted, a current target vehicle-speed value is multiplied by weight w=1. Therefore, when the maximum deviation amount MaxD is less than the return vehicle-speed adoption threshold value JD1, the target vehicle-speed decision unit 603 multiplies the target vehicle-speed candidate by weight 1, that is, the target vehicle-speed candidate is used as a target vehicle speed without any change.

When the maximum deviation amount MaxD is equal to or greater than the return vehicle-speed adoption threshold value JD1 and less than a minimum return vehicle-speed adoption threshold value JD2 used to make a determination whether a predetermined minimum return vehicle speed is adopted for a return to the target route, the target vehicle-speed decision unit 603 multiplies the target vehicle-speed candidate by a weight w that is reduced with an increase of the maximum deviation amount MaxD in a range of $w_{min} < w < 1$ ($w_{min}$ is a value greater than zero and less than 1), in order to determine a target vehicle speed.

When the maximum deviation amount MaxD is equal to or greater than the minimum return vehicle-speed adoption threshold value JD2 and equal to or less than a stop determination threshold value JD3 used to make a determination that a return to the target route is impossible, the target vehicle-speed decision unit 603 determines that the minimum return vehicle speed is adopted as a target vehicle speed. As a result, even if the dump truck 20 deviates from the target route by large amount, the dump truck 20 can return to the target route in a short distance in the travel direction by traveling at a sufficiently low return vehicle-speed (e.g., 5 km/h). On the other hand, if the amount of departure from the target route is relatively small, performing the returning operation at a vehicle speed higher than the minimum return vehicle speed makes it possible to further decrease the effect on the deceleration of the dump truck 20 in the returning operation.

When the maximum deviation amount MaxD is equal to or greater than the stop determination threshold value JD3, the target vehicle-speed decision unit 603 determines that the amount of deviation makes the returning impossible, and is configured to reduce a final target vehicle speed to zero for instruction of making a stop.

The return vehicle-speed adoption threshold value JD1, the minimum return vehicle-speed adoption threshold value JD2 and the stop determination threshold value JD3 as described above may be predetermined with consideration given to external factors such as a loading state of the vehicle, a road width, the presence/absence of occurrence of a passing-by event and/or the like, or instead may be dynamically determined in response to variations in the external factors while the damp truck 20 is traveling.

Figure 10:
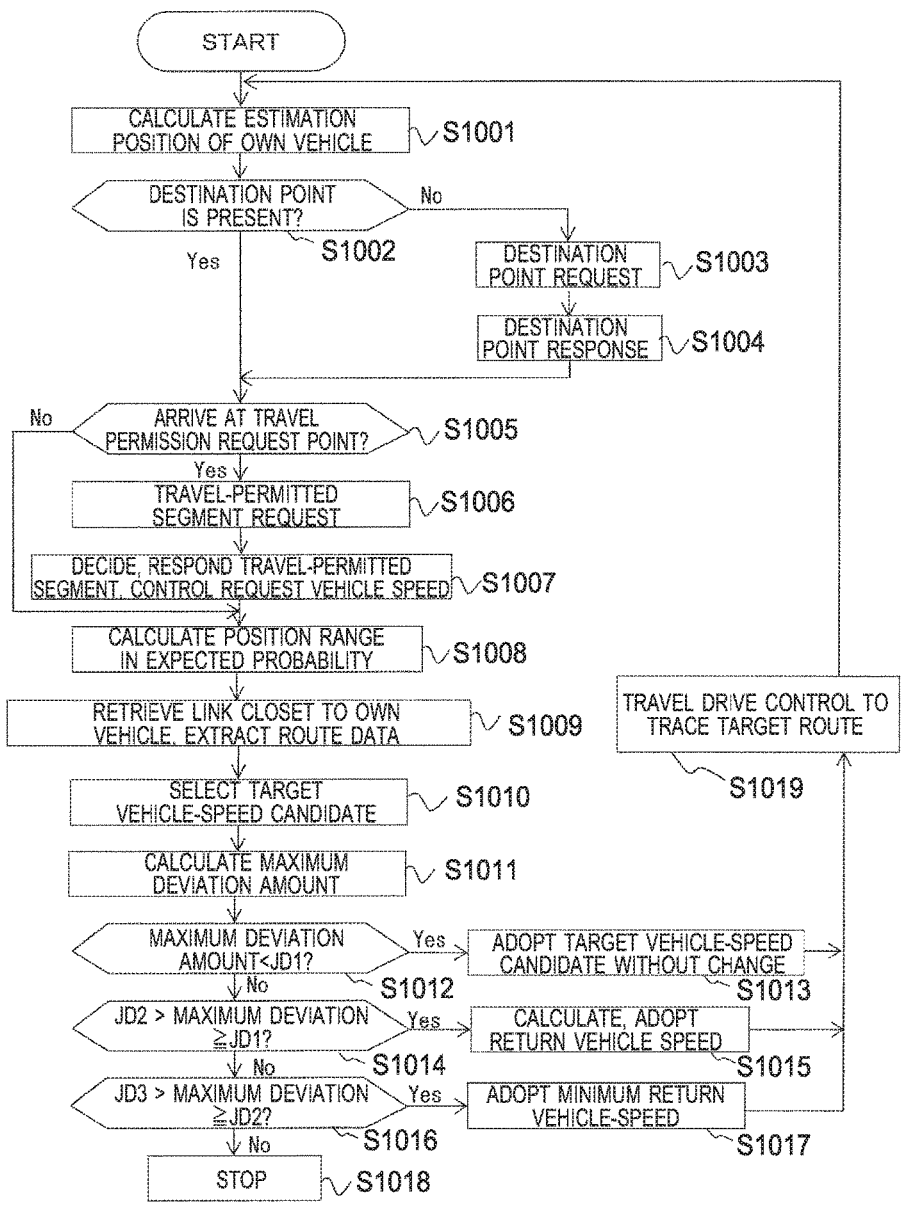
FIG. 10 is a flowchart showing the flow of the travel control processing for the damp truck in accordance with the embodiment.

The flow of the travel control processing for the dump truck in accordance with the embodiment will now be described with reference to FIG. 10. FIG. 10 is a flow chart showing the flow of the travel control processing for the dump truck in accordance with the embodiment.

For initiation of the travel control processing, first, the engine of the dump truck 20 is started. This turns on the main power of the travel control apparatus 200, so that calculations of an estimated position of its own vehicle by the position calculating device 220 are started (S1001). Alternatively, instead of the power source connected to the engine, a power switch may be additionally provided, which may be turned on for power on. If the destination point of the damp truck 20 is yet to be decided (S1002/No), the travel permission request unit 201h makes a request of the control server 31 to set a destination point (S1003), and the control server 31 sets a destination point and sends it to the damp truck 20 (S1004).

If a destination point is set (S1002/Yes, S1004), the travel permission request unit 201h reads an estimated position in the position calculating device 220 to determine whether or not the damp truck 20 arrives at a travel permission request point. If the arrival is determined (S1005/Yes), a request of the control server 31 is made to set the next travel permission request point (S1006). The travel-permitted segment setting unit 311a of the control server 31 sets a travel permitted segment, whereupon the control request vehicle-speed decision unit 311b determines a control request vehicle speed on the basis of the fleet management information and the route request vehicle-speed contained in the route data linked to the link in the travel permitted segment thus set. The control request vehicle-speed decision unit 311b generates the travel-permitted-segment response information showing the above contents and transmits it to the dump truck 20 as a response (S1007).

Further, the position range calculating unit 201b calculates a position range which is centered around the estimated position of its own vehicle acquired from the position calculating device 220 and in which its own vehicle is present with a predetermined expected probability (S1008). The route data extraction unit 201c performs a comparison between the position range and the route data in the route data storage unit 204a, and retrieves a matching link located closest to its own vehicle for extraction of the route data (S1009).

The target vehicle-speed candidate selection unit 601 performs a comparison between the control request vehicle speed and the route request information included in the route data on the matching link read by the route data extraction unit 201c, and selects the lower vehicle speed as a target vehicle-speed candidate (S1010), outputting it to the target vehicle-speed decision unit 603.

The maximum deviation amount calculating unit 602 retrieves a point located farthest from the target route (maximum deviation amount point) on the basis of the position range calculated by the position range calculating unit 201b, and calculates a distance between the maximum deviation amount point and the target route (maximum deviation amount) (S1011), outputting it to the target vehicle-speed decision unit 603.

If the maximum deviation amount is less than the return vehicle-speed adoption threshold value (S1012/Yes), the target vehicle-speed decision unit 603 adopts the target vehicle-speed candidate as a target vehicle speed without any change (S1013), which is then output to the target route-tracing unit 201g.

If the maximum deviation amount is equal to or greater than the return vehicle-speed adoption threshold value and less than the minimum return vehicle-speed adoption threshold value (S1014/Yes), the target vehicle-speed decision unit 603 multiplies the target vehicle-speed, candidate by a weight smaller than 1 to calculate a return vehicle speed, and adopts it as a target vehicle speed (S1015), which is then output to the target route-tracing unit 201g.

If the maximum deviation amount is equal to or greater than the minimum return vehicle-speed adoption threshold value and less than the stop determination threshold value (S1016/Yes), the target vehicle-speed decision unit 603 adopts the minimum return vehicle speed as a target vehicle speed (S1017), which is then output to the target route-tracing unit 201g.

If the maximum deviation amount is equal to or greater than the stop determination threshold value (S1018/Yes), the target vehicle-speed decision unit 603 determines that the damp truck 20 is to be stopped, which is then output to the target route-tracing unit 201g.

The target torque producing unit 501 of the target route-tracing unit 201g calculates a torque to achieve the acquired target vehicle speed and also the target steering-angle producing unit 502 references coordinates of the front node of the matching link, and the front boundary point and the rear boundary point of the travel permitted segment included in the travel permission response information to calculate a steering angle for travelling along the target route. And, in conformance with the calculated torque and the calculated steering angle, the drive control is performed on the travel drive device 210 (S1019). During the travelling, the flow returns to step S1001 to repeat the above series of processes.

According to the embodiment, even if the amount of departure from a target route is large, the damp truck 20 can decrease the amount of departure from the target route by being given a return vehicle speed, so that there is no need to set a final target vehicle speed to zero. However, in environments such as amine, a significantly large deviation from the target route increases the risks of occurrences of events of swerving off the road and colliding with an oncoming vehicle for the reasons of a limited road width, the existence of an oncoming traffic lane, and the like. Given these circumstances, the setting of the final target vehicle speed of zero makes it possible to avoid the occurrence of such events.

The above-illustrated embodiment should not be taken as limiting the present invention, and various modifications may be made without departing from the scope and sprit of the present invention. Another embodiment is described with reference to FIG. 11. FIG. 11 is a diagram illustrating the concept of another embodiment. For example, as shown in FIG. 11, a range including a target route and extending for a relatively short distance from the target route (for example, the return vehicle-speed adoption threshold value) is set as a first distance range R1. A range adjoining the outside of the first distance range R1 and extending at a relatively far distance from the target route (for example, the minimum vehicle-speed adoption threshold value) is set as a second distance range R2. Further, a range adjoining the outside of the second distance range R2 and extending at a farther distance from the target route (for example, the stop determination threshold value) is set as a third distance range R3. The damp truck 20 may travel at the route request vehicle speed or control request vehicle speed in a range of the first distance range R1, may travel at the return vehicle speed in the second distance range R2 and may travel constantly at the minimum return vehicle speed in the third distance range R3. Further, the damp truck 20 may be stopped outside the third distance range R3. Incidentally, the third distance range R3 may be established as an open end (a range without a specified side on the side opposite to the target route). In this case, the damp truck 20 travels at a constant speed without stopping until returning to the second distance range R2.

As a consequence, even if an estimated position comprises an error, the damp truck 20 can be made to travel based on a comparison between an estimated position with a highest presence possibility and the first distance range, the second distance range, the third distance range, enabling the travel control by absorbing an error in a position calculation.

REFERENCE SIGNS LIST

10 . . . Excavator
20, 20-1, 20-2 . . . Dump truck
31 . . . Control server
40 . . . Wireless communication lines
50-1, 50-2, 50-3 . . . Navigation satellite
60 . . . Travel route

The invention claimed is:

1. A haulage vehicle connected to a control server configured to implement fleet management over wireless lines and to autonomously travel while taking instructions from the control server into account, comprising:
   a GPS (Global Positioning System) to calculate an estimated position of its own vehicle; and
   a travel control apparatus comprising a CPU (Central Processing Unit), a RAM (Random Access Memory), a ROM (Read Only Memory), an HDD (Hard Disk Drive), and an I/F (Interface) that are interconnected through a bus connected to the GPS;
   wherein the travel control apparatus is programmed to:
   calculate a position range which is centered around the estimated position in which the haulage vehicle is present with a predetermined expected probability;
   calculate a maximum deviation amount indicating a highest value among the amounts of deviations between a target route of the haulage vehicle and each of points included in the position range;

set a target vehicle speed of the haulage vehicle to be relatively low when the maximum deviation amount is relatively large; and perform control for the haulage vehicle to travel along the target route in compliance with the target vehicle speed, wherein when the maximum deviation amount is within a range from equal to or higher than a minimum return vehicle-speed adoption threshold value which is a distance threshold value for determining whether a predetermined minimum return vehicle speed is adopted for returning to the target route, to less than a stop determination threshold value which is a distance threshold value for determining that returning to the target route is impossible, the stop determination threshold value being higher than the minimum return vehicle-speed adoption threshold value, the target vehicle-speed decision unit determines that the predetermined minimum return vehicle speed is applied as the target vehicle speed.

2. The haulage vehicle according to claim 1, wherein the travel control apparatus is further programmed to calculate, as the maximum deviation amount, a distance of a longest one of perpendicular lines drawn to the target route from a position at which a straight line extending in parallel to the target route is tangent to an outline of the position range.

3. The haulage vehicle according to claim 1, wherein when the maximum deviation amount is within a range from equal to or higher than a return vehicle-speed adoption threshold value which is a distance threshold value smaller than the minimum return vehicle-speed adoption threshold value, to less than the minimum return vehicle-speed adoption threshold value, the target vehicle-speed decision unit determines to apply, as the target vehicle speed, a return vehicle speed obtained by multiplying either a route request vehicle speed indicating a speed limit predetermined in map information regarding the target route or a control request vehicle speed determined by the control server on the basis of at least one of congestion conditions of the target route and a mining operation efficiency of an overall mine, whichever is a smaller vehicle-speed value, by a weight w (0<w<1) reducing as the maximum deviation amount increases.

4. The haulage vehicle according to claim 1, wherein the travel control apparatus is further programmed to calculate an error ellipse centered around the estimated position, as the position range.

5. A haulage vehicle connected to a control server configured to implement fleet management over wireless lines and to autonomously travel while taking instructions from the control server into account, comprising:

a travel control apparatus that controls the haulage vehicle to travel either at a route request vehicle speed indicating a speed limit predetermined in map information regarding a target route or at a control request vehicle speed determined by the control server on the basis of congestion conditions of the target route, in a first distance range including the target route of the haulage vehicle, to travel at a return vehicle speed, which is the vehicle speed of the vehicle on the way back to the target route, showing a vehicle-speed value reduced as the amount of positional departure between the vehicle's position and the target position increases, when the haulage vehicle is located in a second distance range adjacent to an outer side of the first distance range, and to travel constantly at a minimum return vehicle speed less than the return vehicle speed predetermined to return the haulage vehicle to the target route, when the haulage vehicle is located in a third distance range adjacent to an outer side of the second distance range; and a travel drive system configured to drive under control by the travel control apparatus.

6. A travel control apparatus of a haulage vehicle installed in a haulage vehicle connected to a control server configured to implement fleet management over wireless lines and to autonomously travel on the basis of instructions from the control server and an estimated position of its own vehicle output by a position calculating system installed in the own vehicle, comprising:

a CPU (Central Processing Unit), a RAM (Random Access Memory), a ROM (Read Only Memory), an HDD (Hard Disk Drive), and an I/F (Interface) that are interconnected through a bus connected to a GPS (Global Positioning System);

wherein the travel control apparatus is programmed to:

calculate a position range which is centered around the estimated position and in which the haulage vehicle is present with a predetermined expected probability;

calculate a maximum deviation amount showing a highest value among the amounts of deviations between a target route of the haulage vehicle and each of points included in the position range;

to set a target vehicle speed of the haulage vehicle to be relatively low when the maximum deviation amount is relatively large; and perform control for the haulage vehicle to travel along the target route in compliance with the target vehicle speed, wherein when the maximum deviation amount is within a range from equal to or higher than a minimum return vehicle-speed adoption threshold value which is a distance threshold value for determining whether a predetermined minimum return vehicle speed is adopted for returning to the target route, to less than a stop determination threshold value which is a distance threshold value for determining that returning to the target route is impossible, the stop determination threshold value being higher than the minimum return vehicle-speed adoption threshold value, the target vehicle-speed decision unit determines that the predetermined minimum return vehicle speed is applied as the target vehicle speed.

* * * * *